(12) United States Patent
Connelly et al.

(10) Patent No.: US 7,850,058 B2
(45) Date of Patent: Dec. 14, 2010

(54) SUPERPLASTIC FORMING OF TITANIUM ASSEMBLIES

(75) Inventors: Thomas J. Connelly, Rellevue, WA (US); Kent W. Dunstan, Federal Way, WA (US); William T. Williams, III, Federal Way, WA (US); Peter N. Comley, Sumner, WA (US); Larry D. Hefti, Auburn, WA (US)

(73) Assignee: The Boeing Company, Chicago, IL (US)

( * ) Notice: Subject to any disclaimer, the term of this patent is extended or adjusted under 35 U.S.C. 154(b) by 451 days.

(21) Appl. No.: 11/272,244

(22) Filed: Nov. 10, 2005

(65) Prior Publication Data

US 2007/0102494 A1 May 10, 2007
US 2009/0026246 A9 Jan. 29, 2009

Related U.S. Application Data

(63) Continuation-in-part of application No. 10/813,892, filed on Mar. 31, 2004, now Pat. No. 7,533,794.

(51) Int. Cl.
   *B23K 31/00* (2006.01)
(52) U.S. Cl. .................. 228/157; 228/193; 148/564
(58) Field of Classification Search .................. 228/157; 148/564
   See application file for complete search history.

(56) References Cited

U.S. PATENT DOCUMENTS

| 3,713,207 | A | 1/1973 | Ruckle et al. |
| 3,927,817 | A | 12/1975 | Hamilton et al. |
| 4,331,284 | A | 5/1982 | Schulz et al. |
| 4,361,262 | A | 11/1982 | Israeli |
| 4,406,393 | A | 9/1983 | Ascani et al. |
| 4,526,312 | A | 7/1985 | Goss et al. |
| 4,658,362 | A | 4/1987 | Bhatt |
| 4,712,750 | A | 12/1987 | Ridgwell |
| 4,820,355 | A | * 4/1989 | Bampton ..................... 148/535 |
| 4,846,393 | A | 7/1989 | Devillard |
| 4,882,823 | A | 11/1989 | Weisert et al. |
| 4,982,893 | A | 1/1991 | Ruckle et al. |

(Continued)

FOREIGN PATENT DOCUMENTS

EP    0 507 067    10/1992

(Continued)

OTHER PUBLICATIONS

Search Report and Written Opinion for PCT/US2006/043671 dated Apr. 18, 2007.

(Continued)

*Primary Examiner*—Jessica L Ward
*Assistant Examiner*—Nicholas P D'Aniello
(74) *Attorney, Agent, or Firm*—Alston & Bird LLP (57) ABSTRACT

A method of superplastic forming of titanium packs and an associated assembly is provided. The titanium packs can include sheets having different granular structures so that the different sheets are adapted to superplastically form at different temperatures. One or more of the sheets can be formed at a temperature that is below the superplastic forming temperature of another sheet in the pack. In some cases, the occurrence of markoff can be reduced or eliminated.

10 Claims, 9 Drawing Sheets

U.S. PATENT DOCUMENTS

| | | | |
|---|---|---|---|
| 5,024,369 | A | 6/1991 | Froes et al. |
| 5,118,026 | A * | 6/1992 | Stacher ................... 228/157 |
| 5,124,121 | A | 6/1992 | Ogawa et al. |
| 5,214,948 | A | 6/1993 | Sanders et al. |
| 5,330,092 | A | 7/1994 | Gregg et al. |
| 5,460,317 | A | 10/1995 | Thomas et al. |
| 5,683,607 | A | 11/1997 | Gillespie et al. |
| 5,715,644 | A | 2/1998 | Yasui |
| 6,612,020 | B2 | 9/2003 | Sanders |
| 2002/0079351 | A1 | 6/2002 | Mishra et al. |
| 2003/0192939 | A1 | 10/2003 | Mishra |
| 2003/0201366 | A1 | 10/2003 | Connelly et al. |
| 2005/0133567 | A1 | 6/2005 | Runyan |
| 2005/0218193 | A1 | 10/2005 | Comley et al. |

FOREIGN PATENT DOCUMENTS

WO      WO9513406 A1      5/1995

OTHER PUBLICATIONS

U.S. Appl. No. 10/970,151, filed Oct. 21, 2004, Sanders et al.

H. Van Swygenhoven, "Plastic Deformation in Metals with Nanosized Grains: Atomistic Simulations and Experiments," Superplasticity in Advanced Materials-ICSAM 2003, Materials Science Forum vols. 447-448, 2004, pp. 3-10, Trans Tech Publications, Switzerland.

H. Muto, Y. Takahashi and M. Sakai, "Grain-Size-Dependent Cooperative Grain-Boundary Sliding in Superplastic Deformation," Superplasticity in Advanced Materials-ICSAM 2003, Materials Science Forum vols. 447-448, 2004, pp. 97-102, Trans Tech Publications, Switzerland.

Werner Beck, "Results of In-House Cone-Cup Testing of Low to High Temperature SPF-Alloys," Superplasticity in Advanced Materials-ICSAM 2003, Materials Science Forum vols. 447-448, 2004, pp. 145-152, Trans Tech Publications, Switzerland.

M.T. Perez-Prado, J.A. Del Valle and O.A. Ruano, "Superplastic Behavior of a Fine Grained AZ61 Alloy Processed by Large Strain Hot Rolling," Superplasticity in Advanced Materials-ICSAM 2003, Materials Science Forum vols. 447-448, 2004, pp. 221-226, Trans Tech Publications, Switzerland.

Peter N. Comley, "Lowering the Heat—The Development of Reduced SPF Temperature Titanium Alloys for Aircraft Production," Superplasticity in Advanced Materials-ICSAM 2003, Materials Science Forum vols. 447-448, 2004, pp. 233-238, Trans Tech Publications, Switzerland.

N. Miyano, H. Iwasa, K. Isonishi, S. Tanaka, S. Sugiyama and K. Ameyama, "Application of Psuedo-Superplasticity to Produce TiN/$Ti_5Si_3$ and TiC/$Ti_5Si_3$ Nano Grain Composites for Micro Molding," Superplasticity in Advanced Materials-ICSAM 2003, Materials Science Forum vols. 447-448, 2004, pp. 311-316, Trans Tech Publications, Switzerland.

Cheng Xu, Minoru Furukawa, Zenji Horita and Terence G. Langdon, "Producing Superplastic Ultrafine-Grained Aluminum Alloys through Severe Plastic Deformation," Superplasticity in Advanced Materials-ICSAM 2003, Materials Science Forum vols. 447-448, 2004, pp. 403-410, Trans Tech Publications, Switzerland.

R.Z. Valiev, R.K. Islamgaliev and N.F. Yunusova, "Microstructural Aspects in Superplasticity of Ultrafine-Grained SPD Alloys," Superplasticity in Advanced Materials-ICSAM 2003, Materials Science Forum vols. 447-448, 2004, p. 411-416, Trans Tech Publications, Switzerland.

F. Musin, R. Kaibyshev, Y. Motohashi and G. Itoh, "Superplastic Behaviour and Microstruture Evolution in a Commercial Ulltra-Fine Grained Al-Mg-Sc Alloy," Superplasticity in Advanced Materials-ICSAM 2003, Materials Science Forum vols. 447-448, 2004, pp. 417-422, Trans Tech Publications, Switzerland.

P.J. Apps, C.P. Heason and P.B. Prangnell, "Ultrafine-Grain Structures Produced by Severe Deformation Processing," Superplasticity in Advanced Materials-ICSAM 2003, Materials Science Forum vols. 447-448, 2004, pp: 423-428, Trans Tech Publications, Switzerland.

G.A. Salishchev, O.R. Valiakhmetov, R.M. Galeyev and F.H. Froes, "Characterization of Submircon-Grained Ti-6Al-4V Sheets with Enhanced Superplastic Properties," Superplasticity in Advanced Materials-ICSAM 2003, Materials Science Forum vols. 447-448, 2004, pp. 441-446, Trans Tech Publications, Switzerland.

G.A. Salishchev, S.V. Zherebtsov, O.R. Valiakhmetov, R.M. Galeyev and S.YU. Mironov, "Development of Submicrocrystalline Titanium Alloys Using "abc" Isothermal Forging," Superplasticity in Advanced Materials-ICSAM 2003, Materials Science Forum vols. 447-448, 2004, pp. 459-464, Trans Tech Publications, Switzerland.

F. Musin, R. Kaibyshev, Y. Motohashi and G. Itoh, "Achievement of Low Temperature Superplasticity in a Commercial Aluminum Alloy Processed by Equal-Channel Angular Extrusion," Superplasticity in Advanced Materials-ICSAM 2003, Materials Science Forum vols. 447-448, 2004, pp. 465-470, Trans Tech Publications, Switzerland.

Tsutomu Tanaka, Hiroyuki Watanabe, Masahide Kohzu and Kenji Higashi, "Microstructure and Superplastic Properties at Room Temperature in Zn-22Al Alloy after Equal-Channel-Angular Extrusion," Superplasticity in Advanced Materials-ICSAM 2003, Materials Science Forum vols. 447-448, 2004, pp. 489-494, Trans Tech Publications, Switzerland.

Koichi Makii, Seiya Furuta, Kazuo Aoki, Atsumichi Kushibe, Tsutomu Tanaka and Kenji Higashi, "A Nano-Crystalline Zn-Al Alloy with High Speed Superplasticity at Room Termperature and the Application for Seismic Damper," Superplasticity in Advanced Materials-ICSAM 2003, Materials Science Forum vols. 447-448, 2004, pp. 497-504, Trans Tech Publications, Switzerland.

Murray Mahoney, A.J. Barnes, W.H. Bingle and C. Fuller, "Superplastic Forming of 7475 Al Sheet after Friction Stir Processing (FSP)," Superplasticity in Advanced Materials-ICSAM 2003, Materials Science Forum vols. 447-448, 2004, pp. 505-512, Trans Tech Publications, Switzerland.

Superplasticity in Advanced Materials—ICSAM 2003; pp. 1-2; printed Jan. 8, 2004; http://www.ttp.net/0-87849-937-7/441.htm.

Superplasticity in Advanced Materials—ICSAM 2003; pp. 1- 2; printed Jan. 8, 2004; http://www.ttp.net/0-87849-937-7/239.htm.

ICSAM 2003; Tuesday Schedule.

Justin, Bellamy, et al., Retaining Wall Improvement and Redesign-BR 703.

Superplastic Formability Of SP-700; p. 1; printed Jan. 8, 2004; http://www.rti-intl.com/tag/superf.htm.

VSMPO; pp. 1-2; printed Jan. 8, 2004; http://www.maks.ru/expo/798/anketa.htm.

Materials and Structures Technology Newsletter; vol. 1, Issue 2, McDonnell Douglas Aerospace, May 1996; pp. 1-4; printed Jan. 8, 2004; https://ams2.web.boeing.com/mast/newsletter/9605.html.

Applying Superplastic Forming Principles to Titanium Sheet Metal Forming Problems; p. 1; printed Jan. 8, 2004; http://www.titanium.org/confernces/2003/SPEAKERS.htm.

Low Temperature SPF; p. 1; printed Jan. 8, 2004; http://www.ttp.net/Low_Temperature_SPF.htm.

Diffusion Bonding and Superplastic Behaviour of Titanium Alloys; Abstract of Report on EPSRC ROPA Research Grant K36928; Dr. Norman Ridley; pp. 1-2; printed Jan. 8, 2004; http://www2.umist.ac.uk/material/epsrc/k36928.htm.

Superplasticity in Advanced Materials—ICSAM 2003; pp. 1-3; printed Jan. 8, 2004, http://www.ttp.net/0-87849-937-7/233.htm.

* cited by examiner

SUPERPLASTIC FORMING OF TITANIUM ASSEMBLIES

CROSS-REFERENCE TO RELATED APPLICATIONS

The present application is a continuation-in-part of U.S. patent application Ser. No. 10/813,892 to Peter N. Comley, et al., filed Mar. 31, 2004 now U.S. Pat. No. 7,533,794.

BACKGROUND OF THE INVENTION

1) Field of the Invention

The present invention relates to the forming and bonding of structural members and, more particularly, relates to the use of different grain titanium for superplastic forming and/or diffusion bonding.

2) Description of Related Art

Superplastic forming (SPF) generally refers to a process in which a material is superplastically deformed beyond its normal limits of plastic deformation. Superplastic forming can be performed with certain materials that exhibit superplastic properties within limited ranges of temperature and strain rate. For example, workpieces formed of titanium alloys are typically superplastically formed in a temperature range between about 1450° F. and 1850° F. at a strain rate up to about $3 \times 10^{-4}$ per second.

Diffusion bonding (DB) generally refers to a process of joining members using heat and pressure to form a solid-state coalescence between the materials of the joined members. Joining by diffusion bonding occurs at a temperature below the melting point of the materials that are being joined, and the coalescence therebetween is produced with loads below those that would cause macroscopic deformation of the article.

According to one conventional process, superplastic forming is performed by providing one or more superplastically formable metal sheets in a die cavity defined between cooperable dies, heating the sheets to an elevated temperature at which the sheets exhibit superplasticity, and then using a gas to apply differential pressures to the opposite sides of the sheets in order to form the sheets. The pressure is selected to strain the material at a strain rate that is within its superplasticity range at the elevated temperature, stretch the sheet, and cause it to assume the shape of the die surface. In this way, the sheet can be formed to a complex shape defined by the dies.

Further, in some cases, superplastic forming and diffusion bonding are performed in a combined forming/bonding operation. For example, in one typical combined SPF/DB process, three metal sheets are stacked to form a pack. A stop-off material is selectively provided between the sheets to prevent portions of the adjacent surfaces of the sheets from being bonded. The pack is heated and compressed in a die cavity with sufficient gas pressure so that the adjacent portions of the sheets that are not treated with the stop-off material are joined by diffusion bonding. Thereafter, a pressurized gas is injected between the sheets to inflate the pack, and thereby superplastically form the pack to a configuration defined by the surface of the die cavity. This process is described further in U.S. Pat. No. 3,927,817 to Hamilton, et al. Such a combined SPF/DB process can be used, e.g., to produce complex honeycomb sandwich structures that are formed and diffusion bonded to define hollow internal cells. Generally, the simplicity of the superplastic forming and/or diffusion bonding processes can result in lighter and less expensive structures with fewer fasteners and higher potential geometric complexity. Applications of SPF and/or DB include the manufacturing of parts for aircraft, other aerospace structures, non-aerospace vehicles and structures, and the like.

Figure 1:
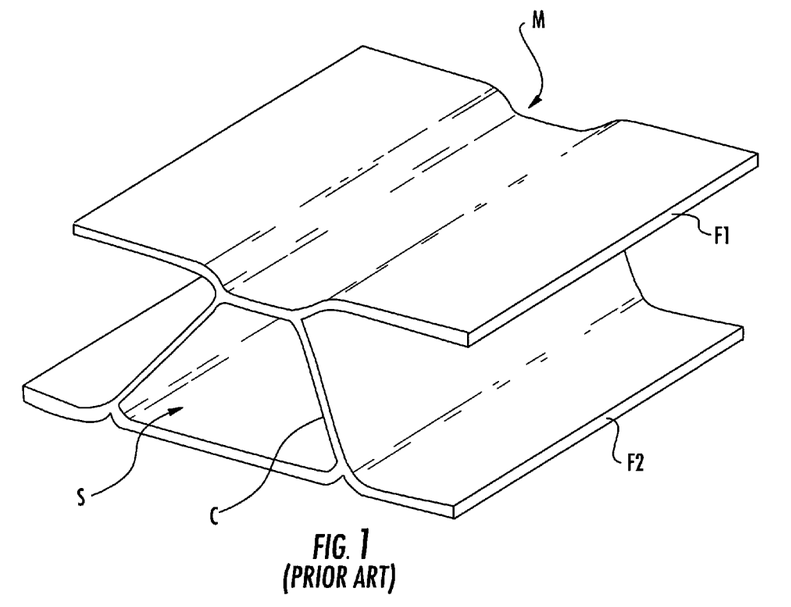
FIG. 1 is a perspective view illustrating a portion of a structural assembly manufactured by diffusion bonding and superplastically forming a three-sheet pack according to a conventional process.

The individual sheets of a pack for forming according to the foregoing conventional process are typically provided as a flat sheets in a stacked relationship. FIG. 1 illustrates a portion of a three-sheet pack after being diffusion bonded and superplastically formed according to the conventional process. As shown, the space S between the outer sheets (or "face sheets") F1, F2 has been expanded by the gas and the middle sheet (or "inner sheet" or "core sheet") C has been superplastically formed to a corrugated or otherwise non-linear shape so that the middle sheet C extends in alternating directions between the outer sheets F1, F2 and defines the cells of the pack. As the outer sheets are expanded outward, the middle sheet tends to exert a reactive force on the outer sheets, thereby causing the outer sheets to be deformed. The effect of this reactive force is shown in FIG. 1 as deformation of the outer sheet where the middle sheet is connected thereto. In particular, instead of the outer sheet defining a flat surface, the outer sheet has been deformed to form a depression M, typically referred to as "markoff," on its surface opposite the connection to the middle sheet.

Such markoff of the outer sheets of a pack during superplastic forming can be reduced by providing a middle sheet that is significantly thinner than the outer sheets, thereby increasing the relative stiffness of the outer sheets and reducing the inward force on the outer sheets during forming. The ratio of the thickness of the middle sheet to the thickness of each outer sheet is typically no more than about 25%. Therefore, if the design requirements for a particular application require a thicker middle sheet, superplastic forming is not typically used. The production of two-sheet assemblies and assemblies having other numbers of sheets can similarly be limited by a desire to avoid markoff.

While the conventional methods for SPF/DB processing have proven effective for manufacturing a variety of structural assemblies, including assemblies formed of titanium, there exists a continued need for improved SPF/DB methods and assemblies. In particular, the method should allow the production of assemblies with a greater range of desired dimensions, including assemblies with sheets of particular dimensions.

BRIEF SUMMARY OF THE INVENTION

Embodiments of the present invention provide a method of superplastically forming titanium sheets and an assembly that is formed by such a method. Titanium sheets having different granular structures are used in the method so that the different sheets are adapted to superplastically form at different temperatures. In some cases, the sheets can be formed without markoff (or without substantial markoff) occurring, even though one or more of the sheets of substantial thickness is subjected to significant forming.

According to one embodiment of the present invention, a structural assembly having a predetermined configuration is produced by superplastically forming a pack having first and second titanium sheets in a stacked configuration. The first sheet has a grain size that is at least about twice a grain size of the second sheet. For example, the first sheet can define a grain size that is greater than about 5 micron and in some cases greater than 8 micron, and the second sheet can define a grain size less than about 2 micron such as between about 0.8 and 1.2 micron. The pack is heated to at least a superplastic forming temperature of the second sheet, and the second sheet is superplastically formed to a predetermined configuration to thereby form the assembly. The second sheet can be superplastically formed at a temperature that is less than the superplastic forming temperature of the first sheet, e.g., at a temperature between about 1400° F. and 1450° F. In some cases, the second sheet is formed without superplastically forming the first sheet, e.g., with the first sheet being only nonsuperplastically formed. The second sheet can be at least 75% as thick as the first sheet. The sheets can be diffusion bonded, and the second sheet can be formed in a direction away from the first sheet. In some cases, the second sheet can also be bonded to a third sheet having a grain size that is less than the grain size of the first sheet so that the third sheet can also be superplastically formed.

According to one aspect of the invention, the first and second sheets form a first structural sub-assembly that is joined to other sub-assemblies, e.g., to form an engine exhaust heat shield. For example, a second sub-assembly can be formed by repeating the providing, heating, and superplastically forming operations used to form the first sub-assembly. The first and second sub-assemblies can be joined to opposite transverse edges of a third sub-assembly, which can also be superplastically formed. The third sub-assembly can define transversely extending channels and each of the first and second sub-assemblies can define transversely extending cells that are offset from the channels of third sub-assembly.

Embodiments of the present invention also provide a superplastically formed structural assembly. The assembly includes a first titanium sheet and a second titanium sheet that is joined to the first sheet in a stacked configuration, e.g., with the sheets joined by diffusion bonds. The second sheet is superplastically formed to a contoured configuration so that the first and second sheets define cells therebetween. Further, the first sheet has a grain size that is at least about twice a grain size of the second sheet so that the first sheet has a superplastic forming temperature that is higher than the superplastic forming temperature of the second sheet. For example, the first sheet can define a grain size of greater than about 5 micron or 8 micron and the second sheet can define a grain size less than about 2 micron such as between about 0.8 and 1.2 micron. The second sheet can be adapted to be superplastically formed at a temperature of between about 1400° F. and 1450° F. The second sheet can have a thickness that is substantial relative to the first sheet, e.g., about 75% of the thickness of the first sheet. Further, the first sheet can define a surface opposite the second sheet, and the surface can have a substantially planar configuration opposite a plurality of joints that connect the first and second sheets, i.e., without markoff or without substantial markoff of the first sheet. In some cases, the assembly can also include a third sheet that is bonded to the second sheet, the third sheet having a grain size less than the grain size of the first sheet.

The first and second sheets can define a first structural sub-assembly of an engine exhaust shield, which can also include second and third sub-assemblies. Similar to the first sub-assembly, the second sub-assembly can include first and second titanium sheets that are joined in a stacked configuration, with the second sheet superplastically formed to a contoured configuration to define cells, and with the first sheet of the second sub-assembly having a grain size that is at least about twice a grain size of the second sheet of the second sub-assembly and a correspondingly higher superplastic forming temperature. The first and second sub-assemblies can be joined to opposite transverse edges of the third sub-assembly, and each of the first and second sub-assemblies can define transversely extending cells that are longitudinally offset from transversely extending channels defined by the third sub-assembly.

Thus, the present invention provides an improved assembly and method for superplastic forming and/or diffusion bonding, in which titanium sheets having different granular structures can be used to produce the assembly. The superplastic forming can be performed at particular temperatures, such as temperatures that are below the superplastic forming temperatures of some or all of the sheets, and the formation of markoff can potentially be reduced or eliminated.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 2:
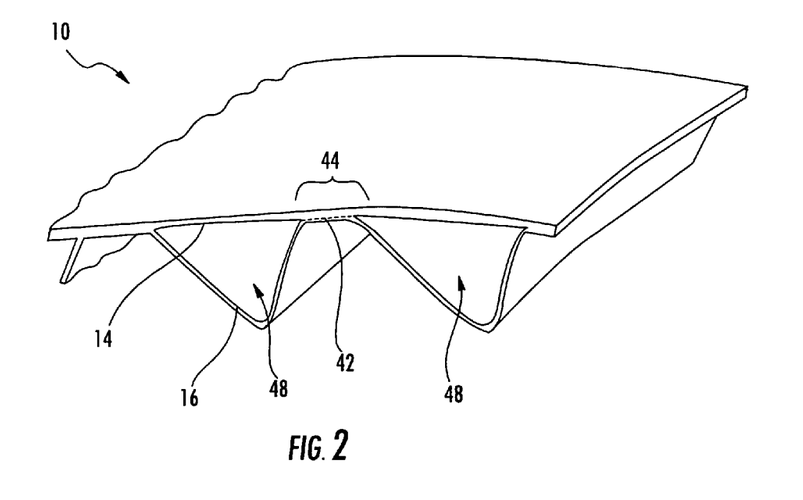
FIG. 2 is a perspective view illustrating a portion of a structural assembly manufactured according to one embodiment of the present invention.

Referring now to the figures and in particular to FIG. 2, there is shown a portion of a structural assembly 10 manufactured according to one embodiment of the present invention. The structural assemblies of the present invention are typically formed of two or more sheets of titanium that are bonded and subjected to a forming operation, in which one or more of the sheets are superplastically formed. The resulting assemblies can be used in a variety of applications, for example, as a member of an aircraft wing, aircraft fuselage, other aeronautical vehicle, or the like. As illustrated in FIGS. 7-13 and described below, the structural assembly 10b can be formed as an engine exhaust heat shield. The structural assemblies can also be formed for and used in a wide variety of other applications including, without limitation, as structural panels or other members for automotive or marine applications, building or other structures, or the like.

Figure 3:
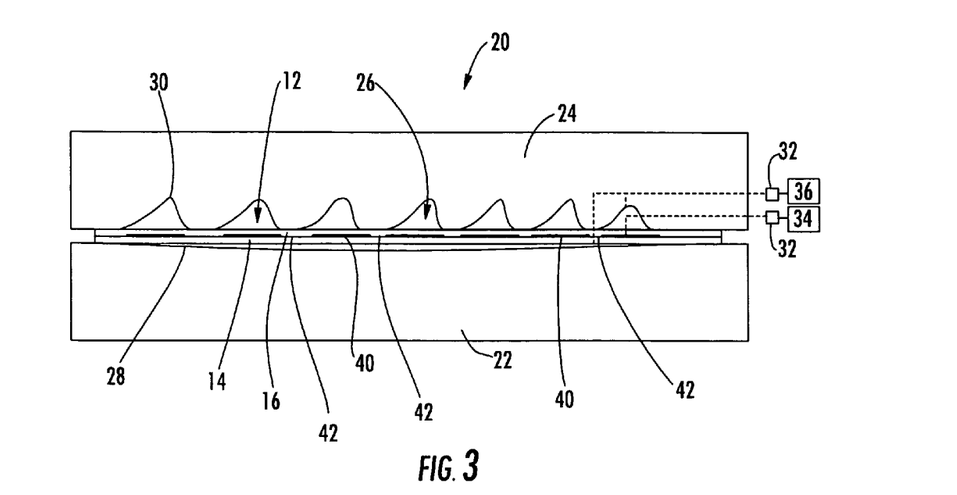
FIG. 3 is a section view illustrating a pack configured in a die for superplastic forming to form the structural assembly of FIG. 2.

The structural assembly 10 is typically manufactured from a pack, i.e., a blank or preform that includes two or more sheets, which are provided in a stacked configuration, and which can be formed to various configurations. For example, FIG. 3 illustrates a pack 12 having two sheets 14, 16, each sheet 14, 16 being initially provided in a laminar configuration, such that the sheets 14, 16 are stacked in parallel planes to form the pack 12. As described below, one or more of the sheets 14, 16 can be superplastically formed to a desired nonplanar configuration defining a simple or complex geometry.

As noted above, the sheets 14, 16 are typically formed of titanium. By the term "formed of titanium," it is meant that the sheets 14, 16 include titanium and, optionally, other materials. Typically, each of the sheets 14, 16 is formed of a titanium alloy. The various sheets 14, 16 of each single assembly 10 can be formed of the same or different alloys of titanium. For example, one or more of the sheets 14, 16 of each assembly 10 can be formed of Ti-6Al-4V (or "Ti 6-4"), which includes approximately 6% by weight aluminum, 4% by weight vanadium, and the remainder titanium, a titanium alloy that is often used for superplastic forming with or without diffusion bonding. Alternatively, one or more of the sheets 14, 16 can be formed of Ti-6Al-2Sn-4V-2Mo or other alloys.

Further, the various sheets 14, 16 of each assembly 10 can define different properties, e.g., as a result of variations in the forming or processing operations performed on the sheets 14, 16. In particular, the sheets 14, 16 can define different granular structures. For example, the first sheet 14 of the pack 12 illustrated in FIG. 3 is formed of titanium having a grain size that is significantly larger than the grain size of the second sheet 16 of the pack 12. That is, the first sheet 14 can be formed of titanium with a standard grain size, e.g., conventional Ti-6Al-4V, which is typically a dual phase material with an equiaxed grain size of between about 5 and 10 micron. The second sheet 16 can also be formed of Ti-6Al-4V, but the grain size of the material of the second sheet 16 can be less than about 5 micron.

The difference in the grain sizes of the materials of the first and second sheets 14, 16 can be significant. In some embodiments, the grain size of the first sheet 14 can be at least twice the grain size of the second sheet 16. For example, the grain size of the first sheet 14 can be over 5 microns, and in some cases, over 8 microns, e.g., between about 8 and 10 microns. The grain size of the second sheet 16 can be less than 5 microns, such as less than 3 microns or less than 2 microns. In particular, the grain size of the second sheet 16 can be between about 0.8 and 1.2 micron and, more particularly, about 1 micron.

The term "grain size" as used herein generally refers to a nominal grain size of the material of the sheets 14, 16 and is not representative of all of the grains thereof. In fact, each sheet 14, 16 typically includes grains of various sizes, some larger and some smaller than the nominal grain size. The nominal grain size for each sheet 14, 16 typically refers to the median grain size of the material of the sheet 14, 16. The term "micron" refers to a length of one micrometer.

It has been discovered that a variation in the grain size affects the forming characteristics of titanium. In particular, titanium having refined or reduced grain sizes can typically be superplastically formed at temperatures less than the superplastic forming temperatures of titanium having larger grain sizes. Thus, the second sheet 16 can be superplastically formed at temperatures lower than the first sheet 14. For example, Ti-6Al-4V with a grain size of about 8-10 microns can typically be superplastically formed at a minimum temperature of about 1650° F. On the other hand, Ti-6Al-4V with a grain size of 1 micron can be superplastically formed at a temperature of less than about 1500° F. and typically less than about 1450° F., such as between about 1400° F. and 1425° F.

Thus, in some cases, the second sheet 16 can be superplastically formed at a temperature that is significantly less than the minimum superplastic forming temperature of the first sheet 14. Typically, the sheets 14, 16 are provided with sufficient variation in grain size and/or composition so that the superplastic forming temperature of the second sheet 16 is between about 25° F. and 300° F. less, and more typically between about 100° F. and 250° F. less, than the superplastic forming temperature of the first sheet 14. That is, if the superplastic forming temperature of the first sheet 14 is about 1650° F., the superplastic forming temperature of the second sheet 16 can be between about 1350° F. and 1625° F. or between about 1400° F. and 1550° F., such as about 1425° F. By virtue of this difference in the superplastic forming temperatures of the various sheets 14, 16 of the pack 12, one or more of the sheets can be superplastically formed while one or more of the other sheets are not superplastically formed. In particular, the second sheet 16 of the pack 12 illustrated in FIG. 3 can be superplastically formed to a predetermined, desired configuration illustrated in FIG. 4, while the first sheet 14 remains unsuperplastically formed. Further, even if the first sheet 14 is superplastically formed during the forming of the second sheet 16, the first sheet 14 can remain less formable than the second sheet 16.

Figure 4:
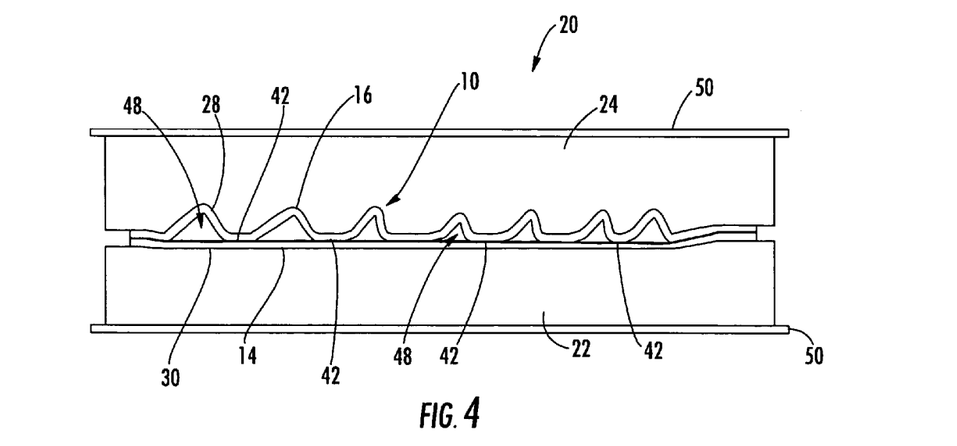
FIG. 4 is a section view illustrating the pack and die of FIG. 3, shown after the pack has been superplastic formed to the desired configuration of the structural assembly of FIG. 2.

For example, FIGS. 3 and 4 illustrate an apparatus 20 for superplastically forming the pack 12 to a desired configuration. Superplastic forming generally refers to a process in which a material is subjected to conditions under which the material exhibits superplastic properties such as the capability of the material to develop unusually high tensile elongations and plastic deformation at elevated temperatures, with a reduced tendency toward necking or thinning. Superplastic forming typically refers to a forming operation in which at least a portion of a member is heated to a superplastic forming temperature and subjected to elongation or strain of at least 50% and, more typically, more than about 100%. The superplastic forming temperature of a material generally refers to the minimum temperature at which the material becomes superplastically formable. The characteristics of superplastic forming are further described in U.S. Pat. No. 3,927,817 to Hamilton, U.S. Pat. No. 4,361,262 to Israeli, and U.S. Pa. No. 5,214,948 to Sanders, each of which is incorporated in its entirety herein by reference, and which generally describe apparatuses in which the methods of the present invention can be performed. As described in the foregoing patents, superplastic forming of a sheet can be performed by applying a pressure differential on opposite sides of the sheet so that the pressure exerts a sufficient force for forming the sheet against a die that defines the desired configuration of the sheet. In addition, multiple sheets can be diffusion bonded or otherwise joined to define internal spaces, such that one or more of the sheets are superplastically formed when the internal spaces are inflated to form an expanded structure, such as honeycomb structure or other cellular structure.

As illustrated in FIG. 3, the forming apparatus 20 includes opposed dies 22, 24 that cooperatively define a die cavity 26 therebetween in which the pack 12 is supported. The first die 22 defines a contour surface 28 corresponding to the desired configuration of the first sheet 14, and the second die 24 defines a contour surface 30 corresponding to the desired configuration of the second sheet 16. Fluid ports 32, which are illustrated only schematically in the figures, fluidly connect to a space defined between the first and second sheets 14, 16 of the pack 12. A fluid source 34 is connected to the ports 32 and provides a pressurized fluid to the space between the sheets 14, 16. The same, or a different fluid source 36, can also be configured to provide a pressurized fluid to the die cavity 26 outside the pack 12. For example, argon gas can be used as the pressurized fluid for superplastically forming and diffusion bonding titanium. Tubes are provided for injecting the pressurized fluid between the sheets 14, 16. That is, the tubes can connect the fluid sources and associated valves or other control devices to the spaces between the sheets 14, 16 and/or to the space between the pack 12 and the die surfaces 28, 30.

As shown in FIG. 3, a stop-off material 40, which can include yttrium oxide, is selectively provided between the sheets 14, 16 in a predetermined pattern to control the formation of diffusion bonds 42 between the sheets 14, 16. The sheets 14, 16 are heated and the fluid source 36 pressurizes the die cavity 26 by providing a pressurized fluid to the die cavity 26 outside the pack 12, i.e., to the spaces between the pack 12 and the dies 22, 24. The sheets 14, 16 are maintained in this compressed and heated condition for a sufficient time for the diffusion bonds 42 to form between the adjacent surfaces of the sheets 14, 16. Generally, a longer time is required for diffusion bonding at lower pressures. For example, while diffusion bonding can be performed in 30 minutes or less, diffusion bonding at a pressure of about 400 psi typically takes about 2 hours and diffusion bonding at a pressure of about 250 psi typically takes about 4 hours. The stop-off material 40 generally prevents portions of the sheets 14, 16 from bonding, so that the resulting diffusion bonds 42 are formed selectively between the sheets 14, 16.

It has also been discovered that the granular structure of the sheets 14, 16 can affect the operational parameters required for diffusion bonding. In particular, sheets of the fine grain titanium materials described in the present invention can generally be diffusion bonded to conventional materials at temperatures less than those typically required for diffusion bonding the same conventional materials. For example, the fine grain second sheet 16 or the resulting assembly 10 that is described above can be diffusion bonded to a conventional member formed of a titanium alloy such as Ti-6Al-4V with a grain size of more than 1 micron at a temperature of less than about 1500° F. In some embodiments of the present invention, this diffusion bonding operation can be performed at a temperature of between about 1400° F. and 1450° F. or between about 1400° F. and 1425° F. In one particular embodiment, the diffusion bonding operation is performed by subjecting the sheets 14, 16 of Ti-6Al-4V to a temperature that is about equal to the superplastic forming temperature of the second sheet 16, e.g., less than 1500° F. such as between about 1400° F. and 1450° F. or between about 1400° F. and 1425° F. While subjected to the heating, the sheets 14, 16 are heated for about 4 hours while urging the sheets 14, 16 together with a pressure of about 300 psi, e.g., in a configuration similar to that of FIG. 3.

It is appreciated that the diffusion bonding operation can be performed while the sheets 14, 16 are in the apparatus 20 or outside the apparatus, e.g., in another device for supporting the sheets 14, 16 during the bonding operation. Further, the sheets 14, 16 can alternatively be joined by methods other than diffusion bonding. For example, in some cases, the sheets 14, 16 can be friction stir welded or otherwise welded. Friction stir welding is generally described in U.S. Pat. No. 5,460,317 to Thomas, et al., and friction stir welding for the formation of preforms that can then be superplastically formed is further described in U.S. patent application Ser. No. 10/781,419, titled "Friction Welded Structural Assembly and Preform and Method for Same," filed Feb. 18, 2004, each of which is incorporated in its entirety herein by reference.

After the bonds 42 are formed by diffusion bonding or otherwise, the pressurized fluid in the die cavity 26 is released. The pack 12 and/or the dies 22, 24 are heated to a superplastic forming temperature, i.e., a temperature within the superplastic forming temperature range of the second sheet 16. The pressurized fluid is injected between the sheets 14, 16 from source 34 to inflate the pack 12 and thereby superplastically form at least one of the sheets 14, 16. In the embodiment of FIGS. 3 and 4, the first sheet 14 is generally maintained or nonsuperplastically formed against the first surface 28, and the second sheet 16 is superplastically formed against the surface 30 of the second die 24 to a generally corrugated configuration as determined by the diffusion bonds 42 between the sheets 14, 16. That is, when subjected to a sufficient pressure differential and heated to the superplastic forming temperature, the second sheet 14 deforms superplastically and is urged against the contour surface 30 of the second die 24, as shown in FIG. 4, thereby inflating the internal spaces of the pack 12 (i.e., coincident with the stop-off material 40 at locations between the diffusion bonds 42) to form expanded cells 48 and forming the desired contoured shape. The first sheet 14, in this embodiment, is not superplastically formed, but is instead slightly (and nonsuperplastically) formed to a desired form, such as the gentle curvature illustrated in FIG. 2. In a typical embodiment, the first sheet 14 can be subjected to maximum elongation or strain of less than 10%, such as less than 5%, and the second sheet 16 can be subjected to maximum elongation or strain of greater than 50%, such as greater than 100%.

The heating for forming and bonding can be provided using various heaters, such as an oven that receives the pack 12 or a heater 50 that is integrated into the dies 22, 24. In some embodiments, the dies 22, 24 can remain relatively unheated while the pack 12 is heated to the superplastic forming temperature by a susceptor in which an electrical current is induced by an induction coil, as described in U.S. Pat. No. 5,683,607 to Gillespie, et al, the entirety of which is incorporated herein by reference.

If the second sheet 16 is superplastically formed at a temperature that is less than the superplastic forming temperature of the first sheet 14, and the first sheet 16 is therefore not heated to its own superplastic forming temperature during the forming operation of the second sheet 16, the deformation of the first sheet 14 can be limited or otherwise controlled. That is, while the first sheet 14 can be slightly formed to conform to the contour of the first die 22, the first sheet 14 typically does not become superplastic and therefore maintains sufficient stiffness during forming to resist being deformed by the formation of the second sheet 16. In particular, even though uneven forces may be exerted on the first sheet 14, e.g., with the first sheet 14 being pulled by the second sheet 16 at the locations of the diffusion bonds 42 therebetween, the first sheet 14 can resist deformation thereby. Thus, after forming to the desired shape of the structural assembly 10 as shown in FIG. 2, the surface of the first sheet 14 opposite the second sheet 16 can show little or no signs of markoff. That is, if the first sheet 14 is supported in a generally planar or slightly curved configuration in the dies 22, 24, the surface of the first sheet 14 can remain generally flat at each local region 44 opposite the diffusion bonds 42 as illustrated in FIG. 2.

Each of the sheets 14, 16 can be provided with various thicknesses and other dimensions. Thus, while the superplastic formation of relatively thick sheets according to conventional forming techniques would typically result in markoff on the sheets connected thereto, the methods of the present invention can be used to superplastically form sheets that are relatively thick compared to the sheets connected thereto without the formation of any markoff or without the formation of significant markoff. In particular, in some embodiments of the present invention, a superplastically formed sheet (such as the second sheet 16) can have a thickness that is at least 25% of the thickness of the sheet(s) that are bonded thereto (such as the first sheet 14). In fact, the superplastically formed sheets can be greater than 50% or 75% of the thickness of the sheets connected thereto and, in some cases, the formed sheets can be as thick as, or thicker than, the sheets connected thereto. For example, as illustrated in FIGS. 2 and 3, the thickness of the second sheet 16 can be about the same as the thickness of the first sheet 14.

In addition, it is appreciated that the superplastic forming and/or diffusion bonding operation of the present invention can generally be performed at reduced temperatures, i.e., at temperatures lower than those required for superplastically forming the coarsest grain materials of the pack 12. For example, if the second sheet 16 is formed of titanium with a refined grain structure, the second sheet 16 can generally be superplastically formed and/or diffusion bonded at temperatures lower than those of conventional superplastic forming and/or diffusion bonding operations. This reduction in processing temperature can reduce the thermal stresses exerted on the dies 22, 24 or other tooling used during the operation, thereby reducing pitting or other degradation of the dies 22, 24 and potentially extending the useful life of the dies 22, 24 and other tooling and reducing cleaning, dressing, or other maintenance. In addition, the lower forming/bonding temperatures generally put less demand on the heater 50 that is used for heating the pack 12 to the forming/bonding temperature, and also require less energy. In fact, the reduction in heating can reduce the initial cost of the heaters, reduce the cost of operating heaters used to heat the packs during forming and/or bonding, and/or extend the useful life of the heaters. Further, in some cases, the use of sheets with refined granular structures can also reduce the necessary forming stress for superplastically forming the materials, and/or increase the strain rates that can be achieved during forming so that the forming operation can be completed more quickly. In addition, the reduction in the forming temperature and time required for forming can reduce both the formation of oxides and a layer of alpha case on the sheets during forming. Methods of superplastically forming refined grain materials, and features of such methods, are further described in U.S. patent application Ser. No. 10/813,892, titled "Superplastic forming and diffusion bonding of fine grain titanium," filed Mar. 31, 2004, the entirety of which is incorporated herein by reference.

Figure 5:
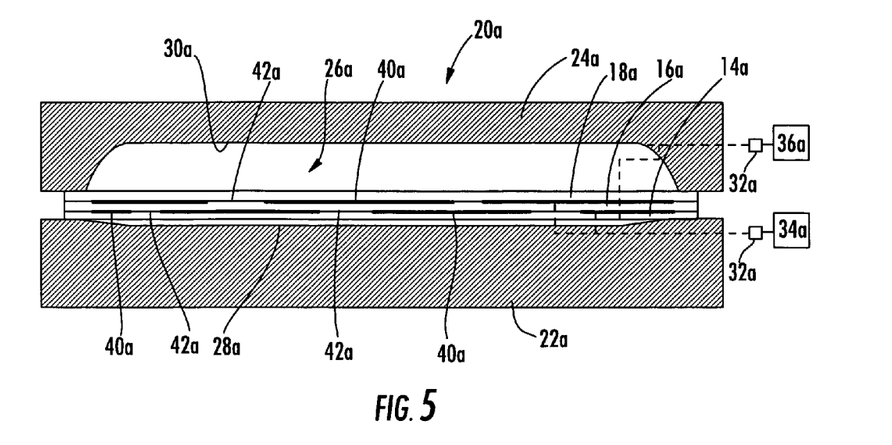
FIG. 5 is a section view illustrating a pack configured in a die for forming a structural assembly according to another embodiment of the present invention.
Figure 6:
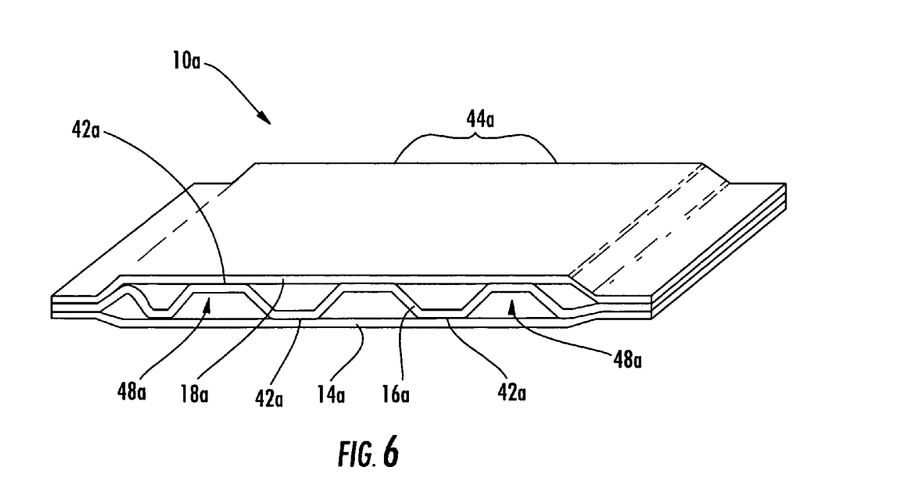
FIG. 6 is a section view illustrating a portion of the structural assembly manufactured from the pack of FIG. 5.

In other embodiments of the present invention, any number of sheets can be bonded and formed. For example, a pack can include three or more sheets, and one or more of the sheets can be superplastically formed, e.g., against multiple contour surfaces. Devices and methods for forming single sheets and multiple-sheet packs are further described in U.S. patent application Ser. No. 10/813,892, titled "Superplastic forming and diffusion bonding of fine grain titanium," incorporated above. In this regard, FIGS. 5 and 6 illustrate the formation of a structural assembly 10a from a pack 12a or preform having three sheets 14a, 16a, 18a. As shown in FIG. 5, the three sheets 14a, 16a, 18a are provided in a stacked configuration in the pack 12a with stop-off material 40a selectively disposed between the sheets 14a, 16a, 18a to prevent bonding from occurring where cells 48a are to be formed between the sheets 14a, 16a, 18a. The pack 12a is heated, in or outside of a die cavity 26a defined by two cooperable dies 22a, 24a of an forming apparatus 20a, and pressure is applied to the pack 12a, e.g., by controlling the flow of pressurized gas from fluid source 36a through ports 32a to facilitate diffusion bonding between the sheets 14a, 16a, 18a. Diffusion bonds 42a are formed between the first and second sheets 14a, 16a and between the second and third sheets 16a, 18a at locations where the stop-off material 40a has not been disposed.

Thereafter, the diffusion bonded pack 12a is heated in the apparatus 20a to a superplastic forming temperature of at least one of the sheets 14a, 16a, 18a. For example, the second and third sheets 16a, 18a can be formed of a material with a refined grain structure with a lower superplastic forming temperature than the first sheet 14a, and the pack 12a can be heated to a temperature that is greater than the superplastic temperature of the second and third sheets 16a, 18a but less than the superplastic forming temperature of the first sheet 14a. With the pack 12a so heated, pressurized fluid is injected from fluid source 34a between the sheets 14a, 16a, 18a to superplastically form the second and third sheets 16a, 18a by inflating the cells 48a defined between the sheets 14a, 16a, 18a, such that the third sheet 18a is disposed against the contoured surface 30a of the second die 24. The first sheet 14a can also be formed during this operation, e.g., to form a slightly curved contour corresponding to surface 28a, but the first sheet 14a is typically not superplastically formed. In this embodiment, the formation of markoff or other undesired deformation of the first sheet 14a can be avoided at regions 44a, even though the thicknesses of the second and third sheets 16a, 18a can be about equal to the thickness of the first sheet 14a or otherwise relatively great compared to the thickness of the first sheet 14a.

FIGS. 7-12 illustrate the various portions of an assembly manufactured according to one embodiment of the present invention and, in particular, an engine exhaust heat shield 10b. The heat shield 10b is adapted for use with a pylon-mounted gas turbine engine, i.e., a gas turbine/turbo fan jet engine that is mounted on a pylon underneath a wing of an aircraft. The pylon supports the engine and is typically designed to minimize drag of the propulsion system and the airplane. Such pylon-mounted engines are further described in U.S. patent application Ser. No. 10/136,817, titled "Hybrid Exhaust Heat Shield for Pylon Mounted Gas Turbine Engines," filed Apr. 30, 2002, the entirety of which is incorporated herein by reference. The heat shield 10b is typically positioned at the bottom of the aft portion of the pylon and above the primary nozzle exhaust and provides a thermal barrier to protect the pylon and/or the wing from the high temperatures generated by the engine at the primary nozzle exhaust thereof.

Figure 7:
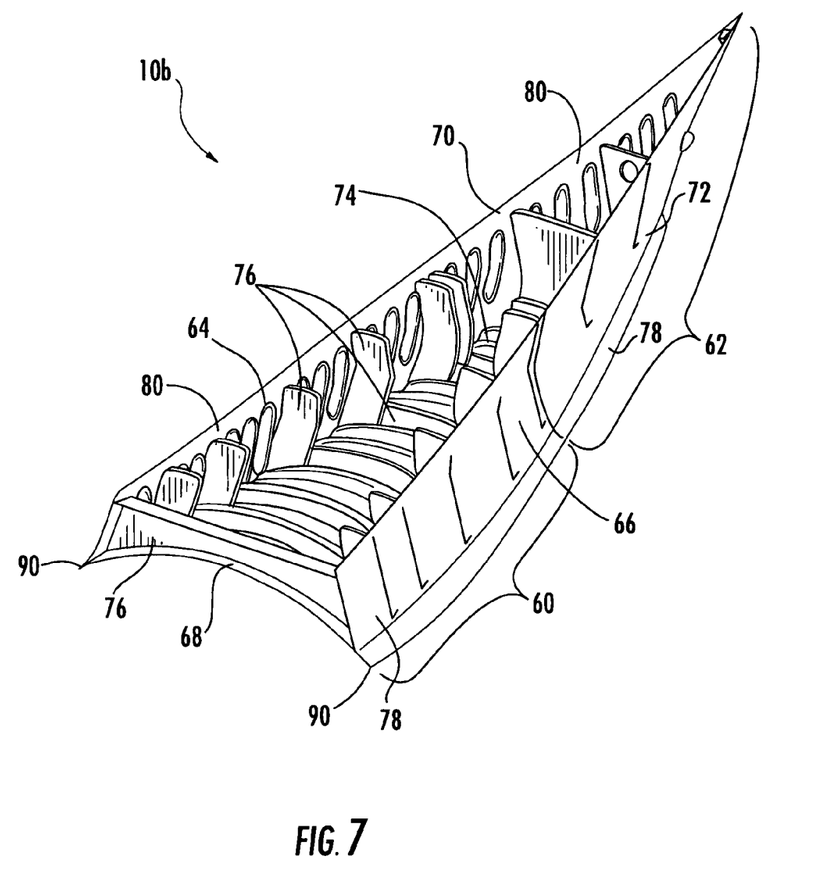
FIG. 7 is a perspective view illustrating an engine exhaust heat shield according to yet another embodiment of the present invention.

The heat shield 10b illustrated in FIG. 7 includes two portions 60, 62 that are connected to extend successively in a longitudinal direction. Each portion 60, 62 is formed of multiple structural sub-assemblies. In particular, the first portion 60 includes three joined sub-assemblies 64, 66, 68, and the second portion 62 includes three joined sub-assemblies 70, 72, 74. Each of the sub-assemblies 64, 66, 68, 70, 72, 74 is formed of one or more titanium sheets. Typically, the sub-assemblies 64, 66, 68, 70, 72, 74 are formed individually and then connected to form the heat shield 10b. Frame members 76 can also be provided to connect the sub-assemblies 64, 66, 68, 70, 72, 74 and support the sub-assemblies in the assembled configuration.

Each of the structural sub-assemblies 64, 66, 68, 70, 72, 74 can be formed by joining multiple sheets and superplastically forming at least one of the joined sheets according to the methods set forth above. For example, each of the first and second sub-assemblies 64, 66, 70, 72 of the two portions 60, 62 includes an outer sheet 78 and an inner sheet 80. Each inner sheet 80 is diffusion bonded or otherwise joined to the outer sheet 78 of the respective sub-assembly 64, 66, 70, 72. The inner sheet 80 is formed of a material that is characterized by a superplastic forming temperature that is less than the minimum superplastic forming temperature of the respective outer sheet 78. Thus, the inner sheets 80 can be superplastically formed at a temperature that is insufficient for superplastically forming the respective outer sheet 78, e.g., to avoid deforming the outer sheet 78 so as to cause markoff as described above. In particular, the inner sheet 80 of each sub-assembly 64, 66, 70, 72 can be formed of titanium with a grain size of less than 5 microns, e.g., about 1 micron, and the outer sheet 78 of each sub-assembly can be formed of titanium with a grain size that is greater than 5 microns, e.g., greater than about 8 microns.

Each inner sheet 80 is superplastically formed to define a number of transversely extending cells 82. For example, as described above, the outer and inner sheets 78, 80 of each sub-assembly 64, 66, 70, 72 can be provided in a substantially planar configuration, with a stop-off material provided between the sheets 78, 80 coincident with the desired location of the cells 82. In this way, the sheets 78, 80 of each sub-assembly 64, 66, 70, 72 can be diffusion bonded without bonding the sheets 78, 80 at the desired location of the cells 82. Thereafter, the sheets 78, 80 can be heated to a superplastic forming temperature of the inner sheet 80, and gas can be injected between the sheets 78, 80 to inflate the cells 82. The cells 82 of each sub-assembly 64, 66, 70, 72 can be fluidly joined by one or more longitudinally extending tubes 86 or bead-like passages, e.g., by applying the stop-off material at the location of the tubes 86 to prevent diffusion bonding. Thus, the cells 82 can be inflated during the superplastic forming of the inner sheet 80 by injected the gas into the tubes 86 so that the gas flows therefrom into each of the cells 82. The cells 82 are normally defined as inwardly extending channels in the inner sheet 80 as shown in FIG. 7.

Figure 8:
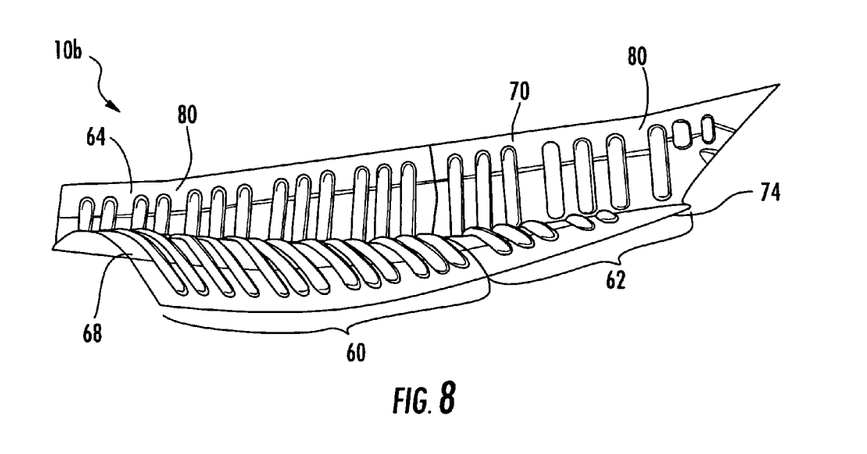
FIG. 8 is a perspective view illustrating first and third sub-assemblies of the engine exhaust heat shield of FIG. 7.
Figure 9:
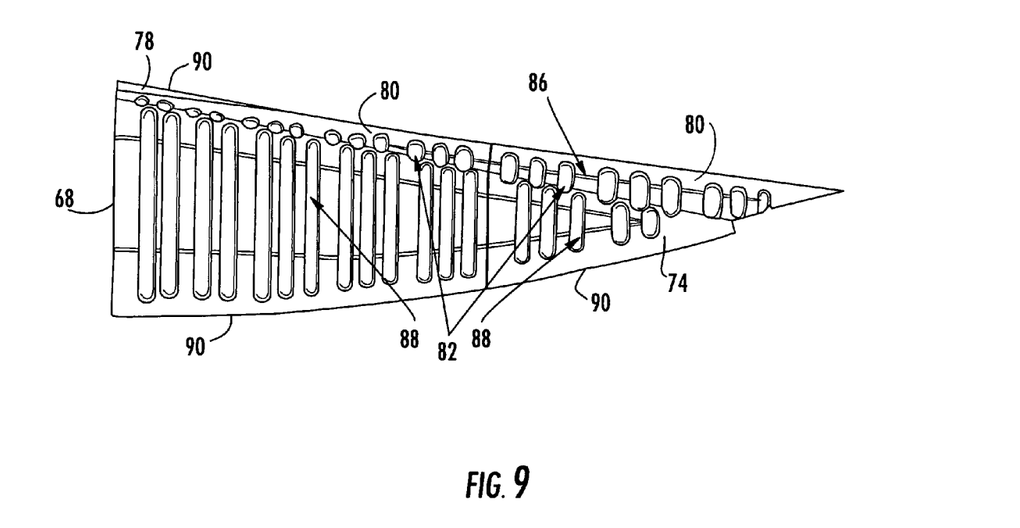
FIG. 9 is a plan view illustrating the first and third sub-assemblies of FIG. 8.

Each of the third sub-assemblies 68, 74 can similarly be formed from a stack or pack of sheets. Alternatively, as illustrated in FIGS. 7-12, each third sub-assembly 68, 74 can be formed of a single sheet that is superplastically formed or otherwise formed to a desired configuration. In one embodiment, each third sub-assembly 68, 74 is formed to define inwardly extending channels 88, as shown in FIGS. 7 and 8. As illustrated in FIG. 9, the transversely extending channels 88 of the third sub-assemblies 68, 74 can be longitudinally offset from the transversely extending cells 82 of the first and second sub-assemblies 64, 66, 70, 72 to avoid interference between the channels 88 and cells 82 proximate to the transverse edges 90 of the third sub-assemblies 68, 74 where the first and second sub-assemblies 64, 66, 70, 72 are joined thereto.

Figure 10:
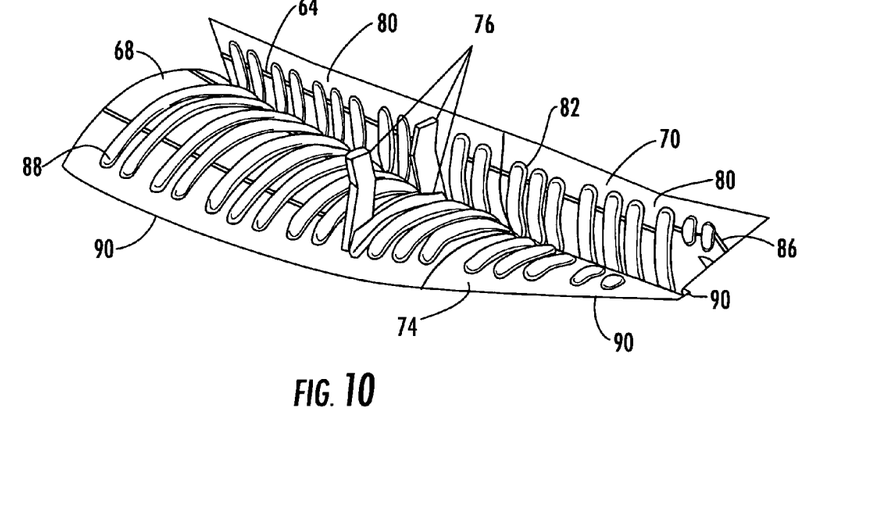
FIG. 10 is another perspective view illustrating first and third sub-assemblies of FIG. 8, with frame members installed.
Figure 11:
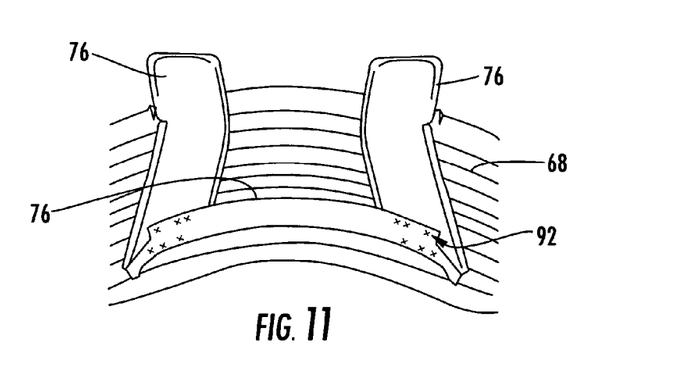
FIG. 11 is a perspective view illustrating the frame members installed in the first and third sub-assemblies of FIG. 10.
Figure 12:
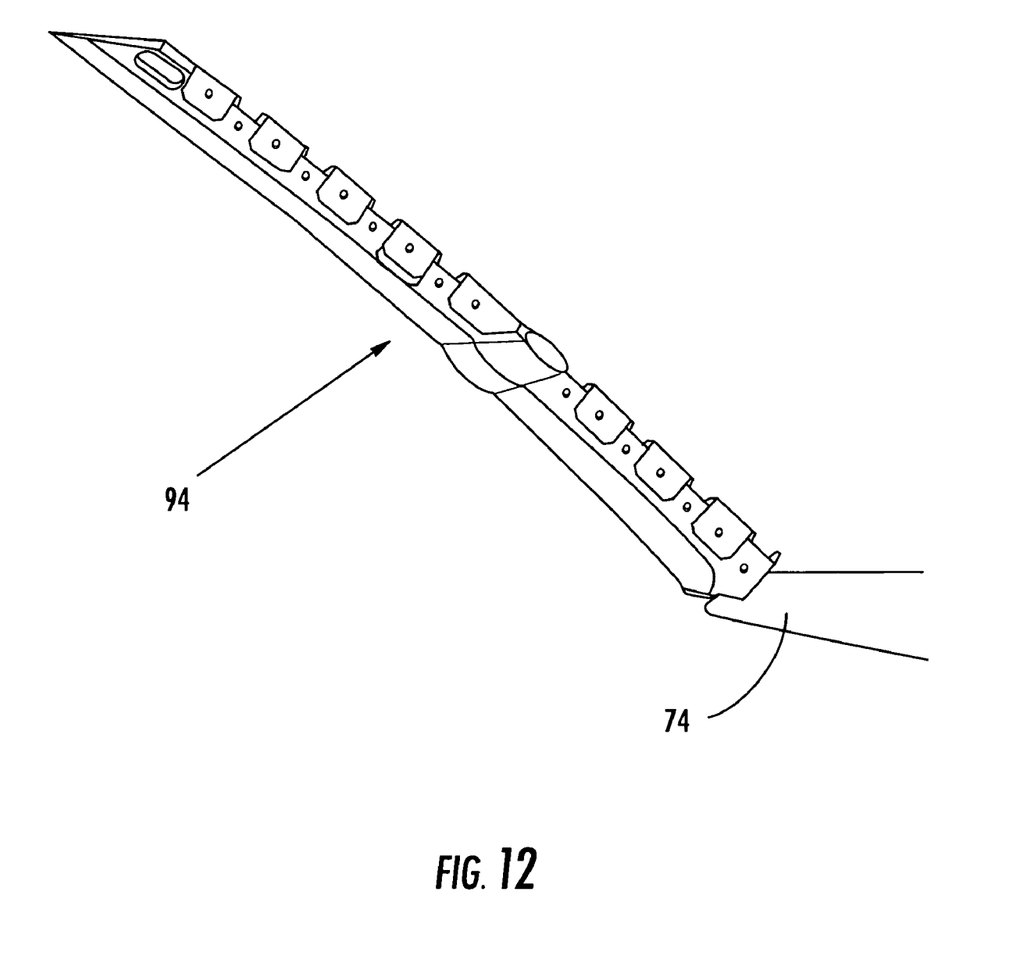
FIG. 12 is a perspective view illustrating a fitting of the engine exhaust heat shield of FIG. 7.

The frame members 76 disposed in the heat shield 10b can also be formed of titanium and can be superplastically formed. As shown in FIGS. 10 and 11, the frame members 76 can be connected to the sub-assemblies 64, 66, 68, 70, 72, 74 using fasteners 92 such as rivets or the like. A closeout fitting 94, shown individually in FIG. 12, can be provided at the trailing edge of the heat shield lb. In some cases, the various assemblies 64, 66, 68, 70, 72, 74 are formed of different materials. For example, the first and second sub-assemblies 64, 66, 70, 72 can be formed of Ti-6Al-4V and the third sub-assemblies 68, 74 can be formed of Ti-6Al-2Sn-4V-2Mo.

In some embodiments, the sub-assemblies 64, 66, 68, 70, 72, 74 are large members, i.e., larger than conventional sub-assemblies that can be formed of members that are formed by casting or other non-superplastic forming methods. The use of superplastic forming in the manufacture of large members is further described in U.S. patent application Ser. No. 10/970,151, titled "Formed Structural Assembly and Associated Preform and Method," filed Oct. 21, 2004. Further, the heat shield 10b can be formed and assembled in a configuration that reduces drag and the potential paths for leaking of hot gases into the cavity defined by the heat shield 10b. In addition, the use of superplastic forming and/or diffusion bonding can reduce the weight of the heat shield 10b and reduce the manufacturing cost.

Figure 13:
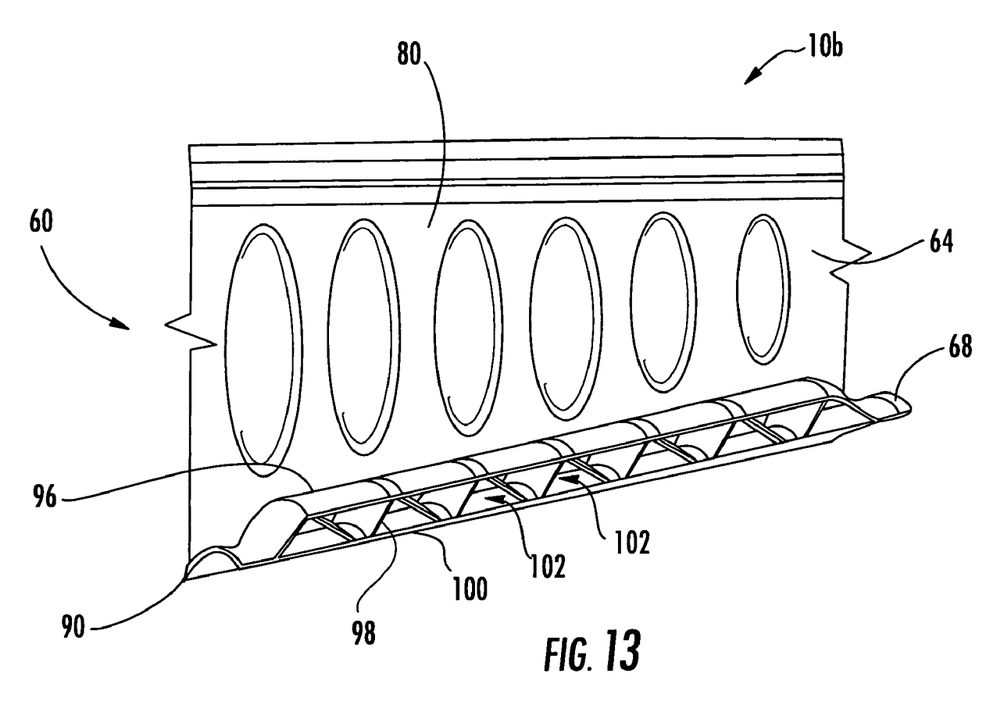
FIG. 13 is a perspective view illustrating first and third sub-assemblies of a first portion of a heat shield according to another embodiment of the present invention, shown with the third sub-assembly in sectional view.

It is also appreciated that each of the various sub-assemblies 64, 66, 68, 70, 72, 74 of the heat shield 10b can be formed of any number of sheets, one or more of which can be superplastically formed and one or more of which can be non-superplastically formed or unformed. In this regard, FIG. 13 illustrates a perspective view of the first portion 60 of the heat shield 10b according to another embodiment of the present invention with the third structural sub-assembly 68 shown in section view. In this embodiment, the third structural sub-assembly 68 is formed of three stacked sheets 96, 98, 100. The inner and middle sheets 96, 98 are superplastically formed to a desired configuration, and the outer sheet 100 is non-superplastically formed. In particular, the middle sheet 98 can define a corrugated configuration similar to that of the middle sheet 16a described above in connection with FIG. 6, such that the third sub-assembly 68 defines transversely extending cells 102 between the inner and middle sheets 96, 98 and between the middle and outer sheets 98, 100. In this embodiment, the inner and middle sheets 96, 98 can be formed of a titanium material with a superplastic forming temperature that is less than the superplastic forming temperature of the outer sheet 100 so that the inner and middle sheets 96, 98 can be superplastically formed at a temperature less than the superplastic forming temperature of the outer sheet 100.

Figure 14:
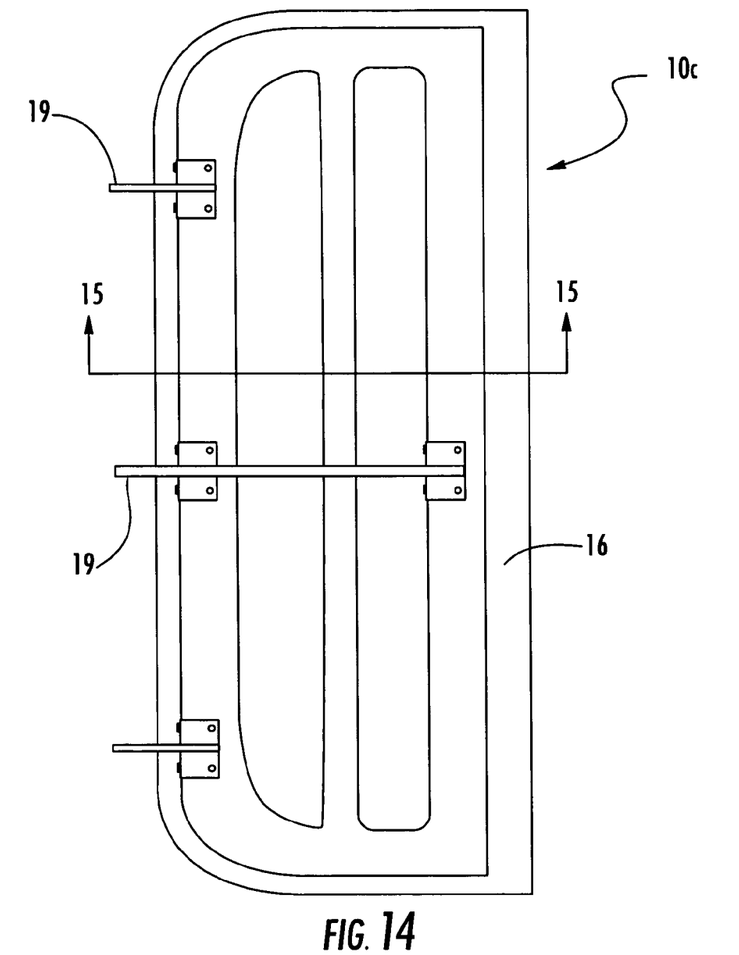
FIG. 14 is a plan view illustrating an access door manufactured according to another embodiment of the present invention.
Figure 15:
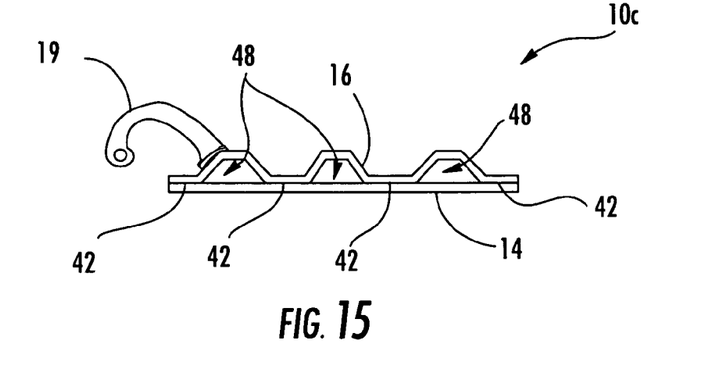
FIG. 15 is a section view illustrating the access door of FIG. 14, as seen along line 15-15 of FIG. 14.

FIGS. 14 and 15 illustrate another structural assembly 10c formed according to another embodiment of the present invention and, in particular, an access door. The illustrated access door 10c is configured for use on an aircraft and, more particular, as the access door for the landing gear compartment of an airplane. The access door 10c is formed by diffusion bonding and forming a pack in a method similar to that described above in connection with FIGS. 2-4. That is, the access door 10c includes first and second sheets 14, 16 that are stacked in flat, parallel planes as a pack, and the pack is then diffusion bonded and formed to the illustrated configuration of the access door 10c. The first sheet 14, which is formed of titanium having a grain size that is significantly larger than the grain size of the second sheet 16, has a flat or slightly curved configuration and is therefore substantially unformed or only slightly formed during manufacture. The second sheet 16, on the other hand, is superplastically formed during manufacture and defines a contoured configuration as illustrated in FIG. 15 so that the two sheets 14, 16 define expanded cells 48 therebetween. The two sheets are joined by diffusion bonds 42. Thus, the first sheet 14 defines an outer surface of the door 10c, which typically defines an outer surface or skin surface of the aircraft, while the second sheet defines ribs or other stiffening structures to support the first sheet 14. Other members can be mounted to the access door 10c, including, e.g., hinge members 19, latches, locks, other supports, or the like.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for diffusion bonding and superplastically forming a pack to produce a structural assembly having a predetermined configuration, the method comprising:
   providing the pack comprising first and second titanium sheets in a stacked configuration, the first sheet having a grain size that is at least about twice a grain size of the second sheet;
   diffusion bonding portions of the first and second sheets at a temperature of less than 1500° F.;
   heating the pack following diffusion bonding to at least a superplastic forming temperature of the second sheet; and
   superplastically forming the second sheet of the pack to a predetermined configuration and thereby forming the assembly,
   wherein said superplastically forming step comprises forming a first structural sub-assembly and further comprising:
   repeating said providing, heating, and superplastically forming steps to form a second structural sub-assembly; and
   joining the first and second sub-assemblies to opposite transverse edges of a third sub-assembly defining transversely extending channels to form an engine exhaust heat shield,
   wherein each of the first and second sub-assemblies defines transversely extending cells, the cells of the first and second sub-assemblies being longitudinally offset from the channels of the third sub-assembly such that at least some of the cells of the first and second sub-assemblies are positioned to alternate in a longitudinal direction with at least some of the channels of the third sub-assembly.

2. A method according to claim 1 wherein said providing step comprises providing the first sheet defining a grain size of greater than about 5 micron and the second sheet defining a grain size less than about 2 micron.

3. A method according to claim 1 wherein said providing step comprises providing the first sheet defining a grain size of greater than about 8 micron and the second sheet defining a grain size of between about 0.8 and 1.2 micron.

4. A method according to claim 1 wherein said providing step comprises providing the second sheet having a thickness that is at least 75% of a thickness of the first sheet.

5. A method according to claim 1 wherein said superplastically forming step comprises forming the second sheet in a direction away from the first sheet.

6. A method according to claim 1 wherein said superplastically forming step comprises superplastically forming the second sheet at a temperature at least 100° F. less than the minimum superplastic forming temperature of the first sheet.

7. A method according to claim 1 wherein said superplastically forming step comprises superplastically forming the second sheet at a temperature of between about 1400° F. and 1450° F.

8. A method according to claim 1, further comprising non-superplastically forming the first sheet during said superplastically forming step.

9. The method of claim 1, further comprising mounting the engine exhaust heat shield on an airframe.

10. The method of claim 1 wherein providing the pack comprises providing the pack comprising the first and second titanium sheets and a third titanium sheets in a stacked configuration with the third sheet forming an outer surface of the pack and the first sheet having a grain size that is larger than a grain size of the second and third sheets, wherein diffusion bonding comprises diffusion bonding portions of the second and third sheets, wherein heating the pack comprises heating the pack to at least a superplastic forming temperature of the second and third sheets, wherein superplastically forming the second sheet comprises superplastically forming the second and third sheets of the pack to a predetermined configuration including superplastically forming the third sheet such that the third sheet is disposed against a contoured surface of a forming die, and wherein superplastically forming the second and third sheets comprises forming the second and third sheets of the pack without superplastically forming the first sheet.

* * * * *